(12) United States Patent
Fukuda

(10) Patent No.: US 11,939,037 B2
(45) Date of Patent: Mar. 26, 2024

(54) OUTBOARD MOTOR

(71) Applicant: HONDA MOTOR CO., LTD., Tokyo (JP)

(72) Inventor: Yoshihiko Fukuda, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 433 days.

(21) Appl. No.: 17/428,756

(22) PCT Filed: Nov. 11, 2019

(86) PCT No.: PCT/JP2019/044121
§ 371 (c)(1),
(2) Date: Aug. 5, 2021

(87) PCT Pub. No.: WO2020/166151
PCT Pub. Date: Aug. 20, 2020

(65) Prior Publication Data
US 2022/0153399 A1    May 19, 2022

(30) Foreign Application Priority Data

Feb. 13, 2019 (JP) .................................. 2019-023657

(51) Int. Cl.
*B63H 21/32* (2006.01)
*F01N 3/20* (2006.01)
(Continued)

(52) U.S. Cl.
CPC .............. *B63H 21/32* (2013.01); *F01N 3/20* (2013.01); *F01N 3/28* (2013.01); *F01N 13/08* (2013.01);
(Continued)

(58) Field of Classification Search
CPC ... B63H 21/32; F01N 3/20; F01N 3/28; F01N 13/08; F01P 3/12; F01P 3/20
See application file for complete search history.

(56) References Cited

U.S. PATENT DOCUMENTS 5,911,608 A * 6/1999 Nakayama ............ F01N 3/2882
440/89 R
6,662,555 B1 * 12/2003 Ishii ........................ F01N 3/28
60/299
(Continued)

FOREIGN PATENT DOCUMENTS

JP    2016-205284    12/2016

OTHER PUBLICATIONS

International Preliminary Report on Patentability dated Aug. 26, 2021, 6 pages.
(Continued)

*Primary Examiner* — Andrew Polay
(74) *Attorney, Agent, or Firm* — Rankin, Hill & Clark LLP

(57) ABSTRACT

Constraints on arrangement of catalysts are reduced, and early activation and long-term performance maintenance of the catalysts are both achieved. An exhaust pipe includes a first catalyst provided in a first exhaust pipe extending upward on the side of an exhaust manifold, and a second catalyst provided in a second exhaust pipe that extends downward from a bent pipe extending from the first exhaust pipe and that is adjacent to the first exhaust pipe. The second catalyst is disposed at a position offset to a higher location from an up-down middle position of the first exhaust pipe.

12 Claims, 5 Drawing Sheets

(51) Int. Cl.
  *F01N 3/28* (2006.01)
  *F01N 13/08* (2010.01)
  *F01P 3/12* (2006.01)
  *F01P 3/20* (2006.01)

(52) U.S. Cl.
  CPC .................. *F01P 3/12* (2013.01); *F01P 3/20* (2013.01); *F01N 2340/02* (2013.01)

(56) References Cited

U.S. PATENT DOCUMENTS

| | | | |
|---|---|---|---|
| 6,925,797 B2* | 8/2005 | Taga | F02D 41/1462 |
| | | | 60/276 |
| 9,840,317 B2* | 12/2017 | Achiwa | F01P 3/202 |
| 2006/0288693 A1* | 12/2006 | Endo | F01N 3/0842 |
| | | | 60/297 |
| 2008/0202100 A1* | 8/2008 | Komatsu | F02D 41/025 |
| | | | 60/285 |

OTHER PUBLICATIONS

Japanese Office Action dated Apr. 5, 2022, English translation included, 5 pages.
International Search Report, dated Dec. 10, 2019, 2 pages.
Written Opinion of the International Searching Authority dated Dec. 11, 2019 filed in PCT/JP2019/044121, 3 pages.

* cited by examiner

OUTBOARD MOTOR

TECHNICAL FIELD

The present invention relates to an outboard motor.

BACKGROUND ART

There has been known a configuration of an outboard motor including an exhaust manifold coupled to an engine to collect exhaust gas from the engine, and an exhaust pipe extending from the exhaust manifold. For this type of exhaust pipe, a structure has been proposed in which there are provided a second passage extending upward along the exhaust manifold, a third passage connected to an upper end part of the second passage and passing through above the exhaust manifold, and a fourth passage connected to the third passage, reversed downward, and extending downward along the exhaust manifold, and in which a plurality of catalysts for exhaust purification is disposed at an intermediate part of the second passage (for example, Patent Literature 1).

CITATION LIST

Patent Literature

Patent Literature 1

Japanese Patent Laid-Open No. 2016-205284

SUMMARY OF INVENTION

Technical Problem

However, in the configuration of Patent Literature 1, since the plurality of catalysts is arranged in a row in the second passage extending upward along the exhaust manifold, there are constraints, such as the second passage is caused to have an inner diameter and a length which allow arrangement of the plurality of catalysts, or the catalysts themselves are designed to be fitted in the second passage and have a sufficient performance.

If some of the catalysts are disposed in an exhaust pipe other than the second passage, the degree of freedom of arrangement of the catalysts is enhanced, but the possibility of being exposed to water becomes higher in the more downstream-side exhaust pipe. Furthermore, the temperature of the exhaust gas becomes lower in the more downstream side, which is disadvantageous for early activation of the catalysts.

Thus, an object of the present invention is to reduce constraints on arrangement of catalysts and achieve both early activation and long-term performance maintenance of the catalysts.

Solution to Problem

All contents of Japanese Patent Application No. 2019-023657 filed on Feb. 13, 2019 are incorporated herein.

To achieve the above object, in an outboard motor including an engine at a position higher than a water surface and having an exhaust manifold provided in the engine to collect exhaust gas from the engine, and an exhaust pipe extending from the exhaust manifold, the exhaust pipe has a first exhaust pipe extending upward on the side of the exhaust manifold, a bent pipe extending from the first exhaust pipe and bending downward, and a second exhaust pipe extending downward from the bent pipe and adjacent to the first exhaust pipe; a first catalyst for exhaust purification is provided in the first exhaust pipe, and a second catalyst for exhaust purification is provided in the second exhaust pipe; and the second catalyst is disposed at a position offset to a higher location from an up-down middle position of the first exhaust pipe.

In the above configuration, each of the first and second catalysts is located offset to a higher location from the up-down middle position of the first exhaust pipe and is disposed at a height in which at least a part of the first catalyst and at least a part of the second catalyst overlap with each other in the horizontal direction.

Furthermore, in the above configuration, a lower end of the first catalyst is provided at a position lower than the second catalyst. Furthermore, in the above configuration, each of the first and second catalysts is located at a height in which at least a part of the first catalyst and at least a part of the second catalyst overlap with each other in the horizontal direction.

Furthermore, in the above configuration, the first exhaust pipe is adjacent to the exhaust manifold and extends upward along the exhaust manifold. Furthermore, in the above configuration, the second exhaust pipe is adjacent to the first exhaust pipe. Furthermore, the second exhaust pipe may be provided on the opposite side of the exhaust manifold via the first exhaust pipe.

Furthermore, in the above configuration, a gap through which exhaust gas is capable of passing is provided at least either between the first exhaust pipe and the first catalyst or between the second exhaust pipe and the second catalyst. Furthermore, in the above configuration, in the exhaust pipe, at least the bent pipe is provided with a water jacket.

Furthermore, in the above configuration, the second catalyst is of a simple type in which the second catalyst is different from the first catalyst in at least either a catalyst material or a carrier that supports the catalyst material. Furthermore, in the above configuration, the first catalyst is a three-way catalyst, and the second catalyst is a catalyst that removes only nitrogen oxides.

Furthermore, in the above configuration, the second catalyst is of an adsorptive type that adsorbs nitrogen oxides; there are provided a controller capable of controlling an air-fuel ratio of an air-fuel mixture supplied to the engine, and a sensor that detects information capable of identifying whether an adsorption amount of the second catalyst is in a state close to a saturated state; and the controller, in the case of controlling the air-fuel ratio to the leaner side than a theoretical air-fuel ratio, when determining that the adsorption amount of the second catalyst is in the state close to the saturated state based on the information detected by the sensor, controls the air-fuel ratio to the richer side than the theoretical air-fuel ratio and promotes a reduction reaction of the nitrogen oxides absorbed by the second catalyst.

Advantageous Effects of Invention

The present invention can reduce constraints on arrangement of the catalysts and achieve both early activation and long-term performance maintenance of the catalysts.

DESCRIPTION OF EMBODIMENTS

Hereinafter, embodiments of the present invention will be described with reference to the drawings.

First Embodiment

Figure 1:
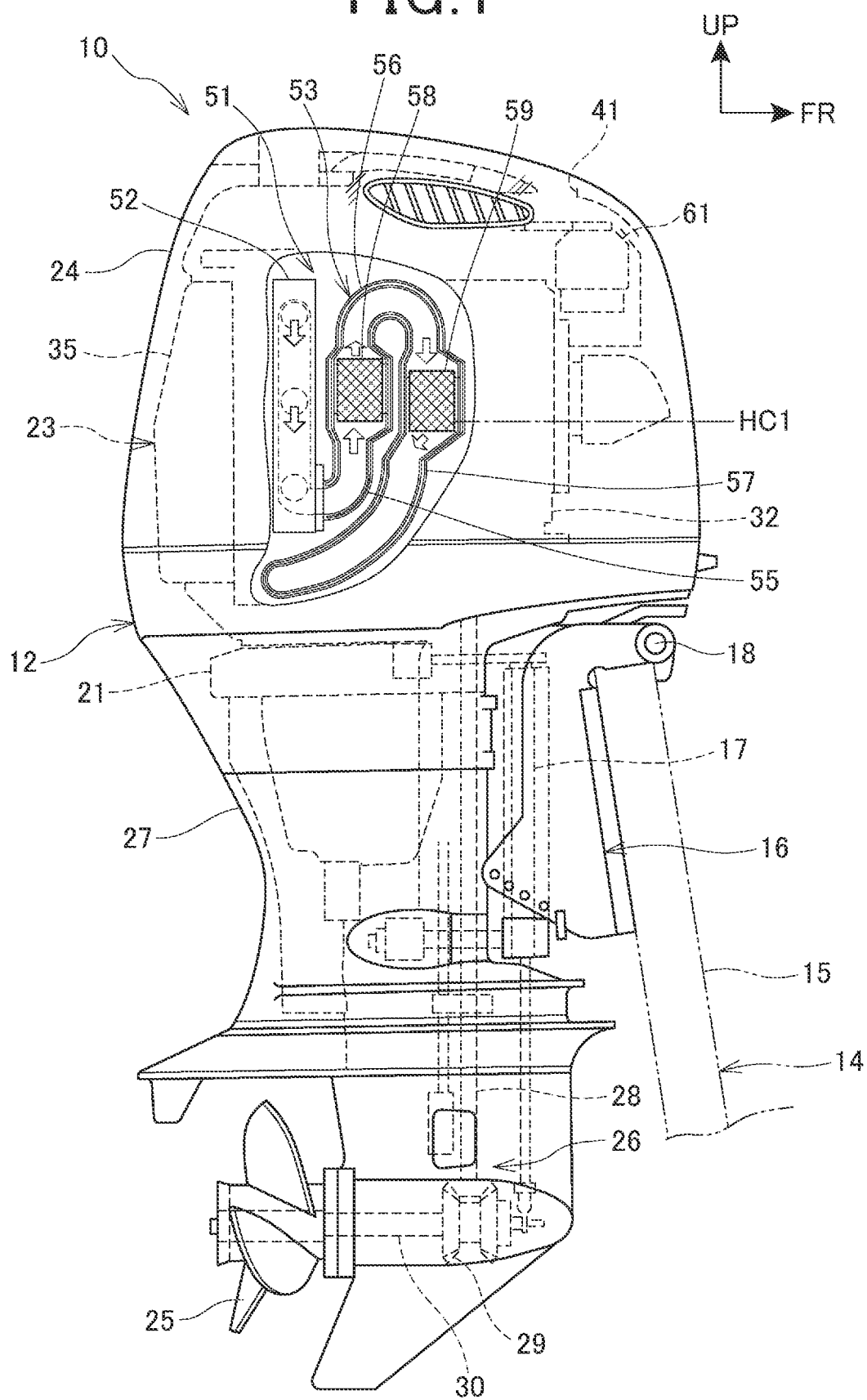
FIG. 1 is a partial cross-sectional view when an outboard motor according to a first embodiment is seen from the right side.

FIG. 1 is a partial cross-sectional view when an outboard motor according to a first embodiment is seen from the right side.

An outboard motor 10 includes an outboard motor body 12 and an attachment part 16 to be attached to a vessel 14. The vessel 14 is, for example, a small vessel with a gross tonnage of less than 20 tons. Each of the directions in the description is a direction based on the outboard motor 10. In FIG. 1 and each of the drawings described later, reference sign FR indicates the front direction of the outboard motor 10, reference sign UR indicates the upper direction of the outboard motor 10, and reference sign LH indicates the left direction of the outboard motor 10.

The attachment part 16 includes a swivel shaft 17 formed in a vertical axis extending in the up-down direction, and a tilt shaft 18 extending in the left-right direction, and is attached to a stern 15 of the vessel 14.

The outboard motor body 12 includes a mount case 21 provided at the attachment part 16. The outboard motor body 12 swings in the left-right direction (horizontal direction) based on the swivel shaft 17 and swings in the up-down direction based on the tilt shaft 18, with respect to the mount case 21. Thus, the outboard motor body 12 is attached swingably in the left-right direction and the up-down direction with respect to the vessel 14.

An engine 23 is supported on the mount case 21. The engine 23 is covered with an engine cover 24 forming an upper-side exterior cover of the outboard motor 10. In the engine cover 24, in addition to the engine 23, there are disposed intake system components 41, exhaust system components 51, and auxiliaries 61 of the engine 23, and electronic components such as a controller 71 (FIG. 3 described later) that controls each part of the outboard motor 10. Each of the engine 23 and the engine cover 24 is at a position higher than the water surface, and each component in the engine cover 24 is at a position at which it is hardly exposed to water.

Under the mount case 21, a power transmission mechanism 26 that transmits a driving force of the engine 23 to a propeller 25 is provided. The power transmission mechanism 26 is covered with an extension cover 27.

The power transmission mechanism 26 includes a driving shaft 28 extending downward in parallel to the swivel shaft 17 behind the swivel shaft 17, and a propeller shaft 30 coupled to a lower part of the driving shaft 28 via a shift mechanism 29 and extending rearward from the shift mechanism 29. The driving shaft 28 is rotationally driven by the engine 23, and the rotation of the driving shaft 28 is transmitted to the propeller shaft 30 via the shift mechanism 29. Under control of the controller 71, the shift mechanism 29 switches the shift position to one of forward, reverse, and neutral.

The propeller 25 is attached to a rear end of the propeller shaft 30. In a state where the vessel 14 is moved forward or backward, the propeller 25 is located in water, and the axis line of the propeller shaft 30 is set to be substantially parallel to the traveling direction of the vessel 14. The propeller 25 is rotationally driven to thereby generate propulsion that moves the vessel 14 forward or backward. A known configuration is widely applicable to the configuration of the power transmission mechanism 26.

Figure 2:
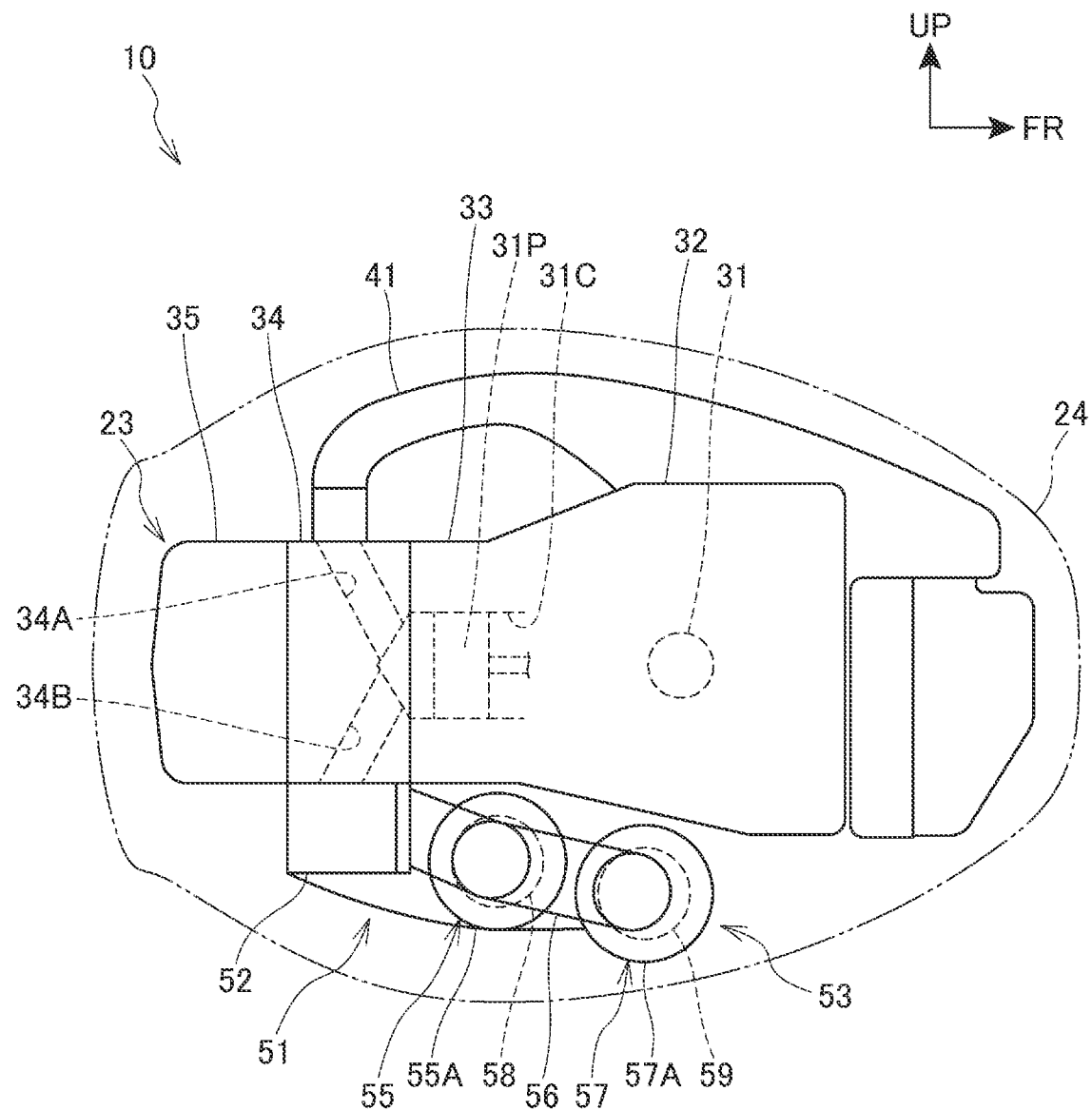
FIG. 2 is a view schematically illustrating an engine from above, together with a peripheral configuration.

FIG. 2 is a view schematically illustrating the engine 23 from above, together with a peripheral configuration. For convenience of description, in FIG. 2, the engine cover 24 is indicated by a two-dot chain line and a structure in the engine cover 24 is indicated by a solid line.

The engine 23 is an internal combustion engine, which is a multi-cylinder gasoline engine in the present embodiment. As illustrated in FIGS. 1 and 2, the engine 23 includes a crankcase 32 that houses a crankshaft 31, a cylinder block 33 provided in a rear part of the crankcase 32 integrally with or separately from the crankcase 32, a cylinder head 34 coupled to the cylinder block 33 from behind, and a head cover 35 coupled to the cylinder head 34 from behind.

The crankcase 32 rotatably supports the crankshaft 31 in a state where the crankshaft 31 is directed in the up-down direction. The cylinder block 33 includes a plurality of cylinders 31C at intervals in the up-down direction in which a plurality of pistons 31P provided on the crankshaft 31 slides. The cylinder head 34 has an intake port 34A and an exhaust port 34B which communicate with each cylinder 31C. The head cover 35 defines a space between the head cover 35 and the cylinder head 34 which houses a valve operating mechanism that opens and closes each of the ports 34A and 34B.

In the present embodiment, the intake ports 34A are open at intervals in the up-down direction on a lateral surface (left-side surface) on either the left or right side of the cylinder head 34, and the intake system components 41 are coupled to the intake ports 34A. Furthermore, the exhaust ports 34B are open at intervals in the up-down direction on a surface (right-side surface) on the other left or right side of the cylinder head 34, and the exhaust system components 51 are coupled to the exhaust ports 34B.

The intake system components 41 are components that supply to the engine 23 an air-fuel mixture in which fuel and air are mixed, and include a throttle device that adjusts a supply amount of the air-fuel mixture under control of the controller 71, a fuel injection device that adjusts an amount of fuel injected into the engine 23 under control of the controller 71, and the like. A known configuration is widely applicable to the configuration of the intake system components 41.

Figure 3:
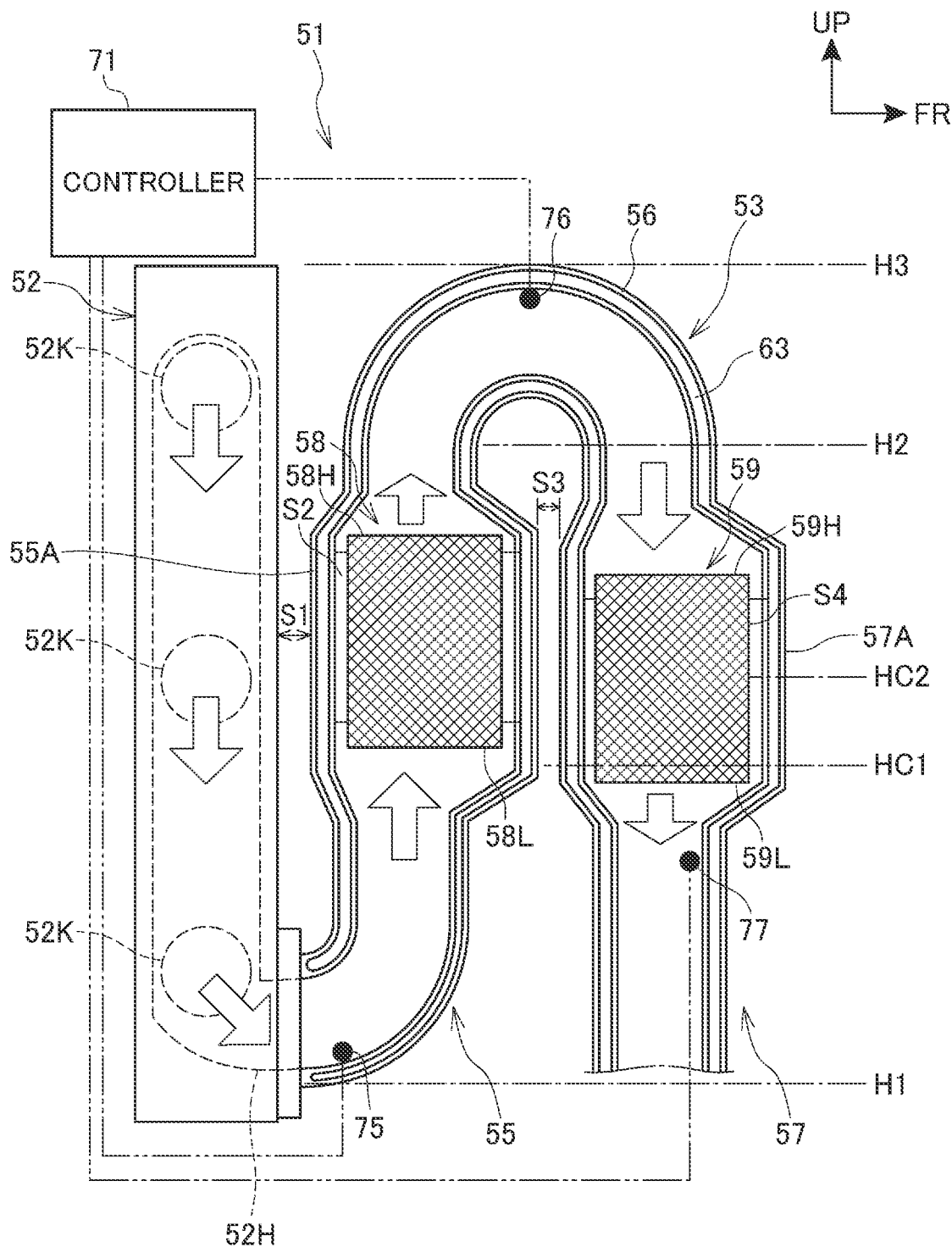
FIG. 3 is a view schematically illustrating a structure of exhaust system components.

FIG. 3 is a view schematically illustrating a structure of the exhaust system components 51.

As illustrated in FIGS. 2 and 3, the exhaust system components 51 include an exhaust manifold 52 coupled to the engine 23, and an exhaust pipe 53 extending from the exhaust manifold 52. The exhaust manifold 52 is provided on a surface (right-side surface) on the exhaust port 34B side of the cylinder head 34 and formed in a hollow box shape extending in the up-down direction. The exhaust manifold 52 includes openings 52K at intervals in the up-down direction which communicate with the respective exhaust ports 34B, and functions as an exhaust gas collector that collects exhaust gas flowing in from each opening 52K.

Furthermore, a single exhaust outlet 52H that discharges the collected exhaust gas is provided on the side of a lowermost part of the exhaust manifold 52 (corresponding to a surface of the outboard motor 10 facing forward).

The exhaust manifold 52 is formed integrally with the cylinder head 34. However, not limited to this configuration, the exhaust manifold 52 may be formed separately from the cylinder head 34.

As illustrated in FIG. 3, the exhaust pipe 53 includes a first exhaust pipe 55 extending upward from the exhaust manifold 52, a bent pipe 56 extending from the first exhaust pipe 55 and bending downward, and a second exhaust pipe 57 extending from the bent pipe 56 and extending downward. Each of the exhaust pipes 55, 56, and 57 is formed of a metal pipe of aluminum alloy, stainless steel, or the like, and can release heat of the exhaust gas passing through each of the exhaust pipes 55, 56, and 57, to the outside. In the present embodiment, each of the exhaust pipes 55, 56, and 57 has a circular cross-section but is not limited to the circular cross-section. The exhaust pipes 55, 56, and 57 may be formed as separate components or may be formed as an integral component.

The first exhaust pipe 55 is formed in a cylindrical shape extending upward on the side of the exhaust manifold 52 from the exhaust outlet 52H of the exhaust manifold 52. The first exhaust pipe 55 has a straight pipe portion adjacent to the exhaust manifold 52 with a predetermined gap S1 and extending upward in parallel to the exhaust manifold 52.

A lower end position H1 and upper end position H2 (corresponding to an upper end position of a straight pipe portion 55A) of the first exhaust pipe 55 are set to a height fitted in a vacant space in which the first exhaust pipe 55 is disposed, that is, a vacant space between the engine 23 and the engine cover 24. More specifically, the lower end position H1 is set to a height near a lower end of the exhaust manifold 52, and the upper end position H2 is set to a height lower than an upper end of the exhaust manifold 52. In FIG. 3, reference sign HC1 indicates an up-down middle position of the first exhaust pipe 55.

A first catalyst 58 that purifies exhaust gas is housed in a straight pipe portion 55C of the first exhaust pipe 55.

The first catalyst 58 is a three-way catalyst that removes harmful components such as hydrocarbon (HC), carbon monoxide (CO), and nitrogen oxide (NOx) in the exhaust gas by oxidation and reduction reactions, and has, for example, a honeycomb catalyst structure in which a porous honeycomb structure is coated with a catalyst component such as platinum, palladium, or rhodium. It is not limited to the honeycomb catalyst structure and may be of a simple type such as a plate catalyst structure in which a catalyst component is supported on a plate material.

The gap S1 between the first exhaust pipe 55 and the exhaust manifold 52 is set to a minimum gap within a range of satisfying various conditions normally required, such as even if the first exhaust pipe 55 vibrates, the first exhaust pipe 55 does not contact the exhaust manifold 52, and the attaching and detaching work of the exhaust pipe is enabled. This causes the first catalyst 58 to be disposed near the exhaust manifold 52.

High-temperature exhaust gas right after exhausted is supplied to the first catalyst 58, and radiant heat of the exhaust manifold 52 acts on the first catalyst 58, so that it becomes possible to quickly bring the temperature of the first catalyst 58 to an activation temperature.

In the present configuration, as illustrated in FIG. 3, a gap S2 through which exhaust gas is capable of passing is provided between the straight pipe portion of the first exhaust pipe 55 and the first catalyst 58. Thus, a part of the exhaust gas that has flowed into the first exhaust pipe 55 can be discharged from the first exhaust pipe 55 without passing through the first catalyst 58, and the exhaust resistance can be reduced as compared with the case where the entire exhaust gas passes through the first catalyst 58. Appropriately adjusting the gap S2 makes it possible to easily adjust exhaust resistance of the first exhaust pipe 55 within a proper range.

In the example of FIG. 3, a part of the straight pipe portion 55A of the first exhaust pipe 55 has a larger diameter than the other part thereof, so that the first catalyst 58 having a relatively large diameter can be disposed, and the flow rate of the exhaust gas passing through the first catalyst 58 is lowered to sufficiently secure the time of contact between the exhaust gas and the first catalyst 58. However, not limited to this configuration, the entire straight pipe portion 55A may have the same diameter.

Furthermore, in the first exhaust pipe 55, at least the large-diameter portion of the straight pipe portion 55A (corresponding to a portion where the first catalyst 58 is disposed) may be formed separately or may be formed integrally. In the case where it is formed separately, a catalyst converter in which the first catalyst 58 is held in a metal case may be prepared and the catalyst converter may be coupled to the first exhaust pipe 55.

The bent pipe 56 is formed in a cylindrical shape extending upward from the first exhaust pipe 55 and then bending downward. The bent pipe 56 may be integrated with the first exhaust pipe 55 or may be separated from the first exhaust pipe 55.

The second exhaust pipe 57 is formed in a cylindrical shape extending downward from the bent pipe 56 and is adjacent to the first exhaust pipe 55. The second exhaust pipe 57 has a straight pipe portion 57A adjacent to the first exhaust pipe 55 with a gap S3 and extending in parallel to the first exhaust pipe 55. A portion downstream of the straight pipe portion 57A extends downward and enters the extension cover 27 (see FIG. 1) to discharge exhaust gas into water. A second catalyst 59 that purifies exhaust gas is housed in the straight pipe portion 57A.

The second catalyst 59 is an adsorptive catalyst that adsorbs only nitrogen oxides, which is more specifically an NOx storage reduction catalyst.

The outboard motor 10 of the present embodiment can perform a lean combustion in which an air-fuel ratio which is a mixture ratio of fuel and air supplied to the engine 23 is set to the leaner side than the theoretical air-fuel ratio. In the case of the lean combustion, using a three-way catalyst for the first catalyst 58 makes it easier to sufficiently remove CO and HC. However, in the case of the lean combustion, the oxygen concentration of the exhaust gas increases, so that oxygen remains and removal of NOx may become insufficient in the first catalyst 58. In the present embodiment, an NOx storage reduction catalyst is used for the second catalyst 59, so that NOx that was not sufficiently removed only by the first catalyst 58 can be removed by the second catalyst 59.

Furthermore, not using a three-way catalyst for the second catalyst 59 is advantageous in that the amount of rare metal such as platinum can be reduced as compared with the case where a three-way catalyst is used for each of the first catalyst 58 and the second catalyst 59, and thus the cost is advantageously reduced.

In the case where it is intended for only the cost reduction, it is not limited to the configuration in which an NOx storage reduction catalyst is used for the second catalyst 59. For example, the second catalyst 59 may be a catalyst in which the number of kinds of the catalyst materials and amounts thereof are reduced as compared with the first catalyst 58, or may have a plate catalyst structure or the like. That is, only making the second catalyst 59 simpler than the first catalyst 58 is advantageous for the cost reduction.

In the case where, for example, the removal performance required in the second catalyst 59 is high, a three-way catalyst may be used for the second catalyst 59.

The gap S3 between the first exhaust pipe 55 and the second exhaust pipe 57, that is, the gap S3 between the straight pipe portions 55A and 57A of the first and second exhaust pipes 55 and 57, is preferably a minimum gap within a range of satisfying general conditions such as the first exhaust pipe 55 and the second exhaust pipe 57 adjacent to each other do not contact each other due to external vibration or the like.

This allows the first exhaust pipe 55 and the second exhaust pipe 57 to be disposed closely, making the entire exhaust pipe 53 compact.

As illustrated in FIG. 3, each of the first catalyst 58 and the second catalyst 59 is disposed at a height in which at least a part of the first catalyst 58 and at least a part of the second catalyst 59 overlap with each other in the horizontal direction. In other words, the second catalyst 59 is located within a height range from a lower end 58L (upstream end) of the first catalyst 58 to an upper end 58H (downstream end) thereof. In the example of FIG. 3, positions of a lower end 59L (downstream end) of the second catalyst 59 and an upper end 59H (upstream end) thereof are set such that 50% or more of the range of the second catalyst 59 overlaps with the first catalyst 58 in the horizontal direction.

Furthermore, as illustrated in FIG. 3, each of the first and second catalysts 58 and 59 is disposed at a position offset to a higher location from an up-down middle position HC1 of the first exhaust pipe 55 (in FIG. 3, an up-down middle position of the second catalyst 59 is indicated by reference sign HC2). This allows the first and second catalysts 58 and 59 to be disposed at a relatively high position, so that a height from the water surface to each of the catalysts 58 and 59 is secured sufficiently, which is advantageous in terms of prevention of exposure to water.

Moreover, the first catalyst 58 on the upstream side is continuous with the second exhaust pipe 57 via the bent pipe 56 bending in a manner of projecting upward, so that a longer distance from the first catalyst 58 to the exhaust pipe outlet can be secured, and the first catalyst 58 is not exposed to water unless water penetrates to the height of the bent pipe 56. Thus, it is advantageous in terms of prevention of exposure of the first catalyst 58 to water.

Although in the example of FIG. 3, the first catalyst 58 is disposed slightly upward relative to the second catalyst 59, the first catalyst 58 and the second catalyst 59 may be disposed at the same height, or the first catalyst 58 may be disposed at a position lower than the second catalyst 59. Furthermore, although in the example of FIG. 3, the first and second catalysts 58 and 59 have the same length, they may have different lengths.

In FIG. 3, reference sign H3 indicates the highest position of the bent pipe 56, which corresponds to the highest position of the exhaust pipe 53. The position H3 depends on the height of the vacant space in which the first exhaust pipe 55 is disposed, that is, the position H3 is set to a position as high as possible in the vacant space between the engine 23 and the engine cover 24. In the present embodiment, the position H3 is set to substantially the same height as the upper end of the exhaust manifold 52.

Furthermore, the second exhaust pipe 57 is provided on the opposite side of the exhaust manifold 52 via the first exhaust pipe 55. According to this configuration, the first exhaust pipe 55 and the second exhaust pipe 57 can be disposed near to each other in this order from the exhaust manifold 52 side, making it easier to dispose these compactly.

By the above configurations, as illustrated in FIG. 2, the first exhaust pipe 55, the bent pipe 56, and the second exhaust pipe 57 can be disposed compactly on the side of the exhaust manifold 52 (corresponding to the front of the outboard motor 10) and in a vacant space vacant on the side of the engine 23 (on the right side of the outboard motor 10), in the engine cover 24.

Furthermore, similarly to the case of the first exhaust pipe 55, a gap S4 through which exhaust gas is capable of passing is provided between the straight pipe portion 57A of the second exhaust pipe 57 and the second catalyst 59, and a part of the straight pipe portion 57A has a larger diameter than the other part thereof to dispose the second catalyst 59 having a relatively large diameter. By these, while exhaust resistance of the second exhaust pipe 57 is reduced within a proper range, the time of contact between the exhaust gas and the second catalyst 59 is secured sufficiently.

Also in the second exhaust pipe 57, the entire straight pipe portion 57A may have the same diameter, or a catalyst converter in which the second catalyst 59 is held in a metal case may be prepared and the catalyst converter may be coupled to the second exhaust pipe 57.

Making the outboard motor 10 of this type compact and achieving the weight reduction are also important in terms of both of the performance and the economy. Furthermore, the outboard motor 10 of the present embodiment performs direct cooling, that is, after sucking water and thereby cooling the engine 23 and the like, the outboard motor 10 of the present embodiment discharges the water to the outside, and accordingly the water may enter the engine 23 and the like due to several conditions, which requires countermeasures for exposure to water. Furthermore, from the facts that the water in the outboard motor 10 passes through the arrangement space of the exhaust pipe 53, and that the outlet of the water and the outlet of the exhaust pipe 53 are continuous spatially, countermeasures for exposure to water are required.

In the present configuration, as illustrated in FIG. 1, the exhaust pipe 53 extends upward from the exhaust manifold 52 and then bends downward to head for the lower side where an exhaust opening is present, which is also effective for countermeasures for exposure of the exhaust pipe 53 to water.

Moreover, the first and second catalysts 58 and 59 are dividedly disposed in the first exhaust pipe 55 extending upward from the exhaust manifold 52 and the second exhaust pipe 57 extending downward from the first exhaust pipe 55 via the bent pipe 56, respectively, so that each of the catalysts 58 and 59 can be downsized and shortened as compared with the case where the catalysts are disposed altogether in either one of the first and second exhaust pipes 55 and 57. Downsizing each of the catalysts 58 and 59 can narrow the lateral width of the outboard motor 10, and shortening each of the catalysts 58 and 59 can also avoid a situation where the first and second exhaust pipes 55 and 57 become longer upward and the outboard motor 10 is increased in size upward.

A plurality of outboard motors of this type may be set depending on the vessel. Steering of the outboard motors is implemented by swaying all of the outboard motors or some of the outboard motors in the left-right direction, and thus a larger lateral width of the outboard motor is more likely to interfere with the next outboard motor. Accordingly, a larger lateral width of the outboard motor makes it impossible to set a necessary number of outboard motors depending on the width of the vessel. The increase in the lateral width of the outboard motor 10 of the present configuration can be suppressed, which is thus suitable for the case where a plurality of outboard motors is set in a vessel.

In terms of early activation of the catalysts, since the first catalyst 58 is disposed in the first exhaust pipe 55, the temperature of the first catalyst 58 can be quickly increased to an activation temperature by high-temperature exhaust gas, which is advantageous for the early activation. Considering durability of the first catalyst 58, it is preferable that the first catalyst 58 is disposed at a position offset to a higher location from the up-down middle position HC1 of the first exhaust pipe 55, as compared with the case where the first catalyst 58 is disposed right behind the exhaust manifold 52.

The second catalyst 59 is also disposed at a position offset to a higher location from the up-down middle position HC1 of the first exhaust pipe 55, which is effective for countermeasures for exposure of the second catalyst 59 to water.

Furthermore, in the present configuration, at least a part of the first catalyst 58 and at least a part of the second catalyst 59 are disposed at a height of overlapping with each other in the horizontal direction, so that it is possible to dispose the first and second catalysts 58 and 59 at a relatively high position while preventing the exhaust pipe 53 from increasing its size upward.

Thus, in the present configuration, a rational catalyst layout is achieved in terms of countermeasures for exposure of the catalysts and the like to water, slimness of the outboard motor 10, and early activation of the catalysts.

As illustrated in FIG. 3, a water jacket 63 is provided in the first exhaust pipe 55, the bent pipe 56, and the second exhaust pipe 57. The water jacket 63 is a cooling water passage to which surrounding water discharged by a not-illustrated water pump included in the outboard motor 10 (which may be cooling water of the engine) is supplied. This can prevent excessive increases in the temperatures of the exhaust pipes 55, 56, and 57 and the catalysts 58 and 59, making it easier to adjust the temperatures within a proper temperature range.

The water jacket 63 is not limited to an aspect in which the water jacket 63 is provided in all of the first exhaust pipe 55, the bent pipe 56, and the second exhaust pipe 57, and the water jacket 63 may be provided only partially. In the case where the water jacket 63 is provided only partially, not only the location can be cooled intensively but also the surroundings thereof can be cooled by thermal conductivity of the exhaust pipe 55, 56, or 57 itself.

In the case where the water jacket 63 is provided, if the water jacket 63 is provided in at least the entire or a part of the bent pipe 56, the upstream side and the downstream side based on the water jacket 63 can be cooled, and the temperatures of both of the first and second catalysts 58 and 59 can be adjusted effectively.

The controller 71 is configured by a microcomputer and the like and centrally controls each part of the outboard motor 10 including the engine 23. The controller 71 has a function of performing normal engine control in which the fuel injection amount is controlled in line with the throttle amount, the engine speed, and the like and, at the time of this engine control, appropriately adjusting the fuel injection amount and the like to perform lean combustion control in which the air-fuel ratio which is the mixture ratio of fuel and air is controlled to the lean side or the like.

As illustrated in FIG. 3, in the exhaust pipe 53, there are provided a first sensor 75 that detects oxygen concentration in the exhaust gas upstream of the first catalyst 58, a second sensor 76 that detects oxygen concentration in the exhaust gas between the first catalyst 58 and the second catalyst 59, and a third sensor 77 that detects oxygen concentration in the exhaust gas downstream of the second catalyst 59. For the first to third sensors 75, 76, and 77, for example, an LAF sensor or an $O_2$ sensor is used.

The controller 71 acquires information capable of identifying exhaust purification states of the first and second catalysts 58 and 59 based on detection results of the first to third sensors 75, 76, and 77. More specifically, the controller 71 obtains a purification rate after passage of the first catalyst 58 by a known method based on a difference between the oxygen concentrations detected by the first and second sensors 75 and 76, and the like. Furthermore, the controller 71 obtains a purification rate after passage of the second catalyst 59 by a known method based on a difference between the oxygen concentrations detected by the second and third sensors 76 and 77, and the like.

For example, under the situation where the engine load is small for the purpose of enhancement of fuel economy or the like, the controller 71 performs the lean combustion control in which the air-fuel ratio is set to the leaner side than the theoretical air-fuel ratio. In the case where the lean combustion has continued for a long time, the NOx adsorption amount of the second catalyst 59 (the NOx storage reduction catalyst in the present embodiment) may reach a saturated adsorption amount.

Accordingly, the controller 71 of the present embodiment, in the case of performing at least the lean combustion control, determines whether the adsorption amount of the second catalyst 59 is in a state close to a saturated state, based on the purification rate obtained from the detection results of the second and third sensors 76 and 77. That is, in the present embodiment, each of the second and third sensors 76 and 77 functions as a sensor that detects information capable of identifying whether the adsorption amount of the second catalyst 59 is in a state close to a saturated state.

The sensor that enables the detection of whether the adsorption amount of the second catalyst 59 is in a state close to a saturated state is not limited to an LAF sensor or an $O_2$ sensor and may be an NOx sensor that detects concentration of NOx.

When determining that the adsorption amount of the second catalyst 59 is in the state close to the saturated state, the controller 71 performs control in which the air-fuel ratio is switched to the richer side than the theoretical air-fuel ratio (hereinafter referred to as a rich spike operation). Switching to the rich side causes NOx stored in the second catalyst 59 to react with HC, so that the reduction reaction of NOx can be promoted.

After the rich spike operation is started, the controller 71 determines whether the air-fuel ratio of the exhaust gas flowing into the second catalyst 59 is sufficiently rich based on the detection result(s) of the first sensor 75 and/or the second sensor 76, and whether with the state, a predetermined time in which the reduction of NOx can be sufficiently performed has elapsed. Then, when determining that the predetermined time has elapsed, the controller 71 stops the rich spike operation and returns to the lean combustion control. By the above control, a situation where the adsorption amount of the second catalyst 59 is in a saturated state can be avoided, and the exhaust gas can be purified continuously.

As described above, the exhaust pipe 53 of the present embodiment includes the first catalyst 58 provided in the first exhaust pipe 55 extending upward on the side of the exhaust manifold 52, and the second catalyst 59 provided in the second exhaust pipe 57 that extends downward from the bent pipe 56 extending from the first exhaust pipe 55 and that is adjacent to the first exhaust pipe 55, wherein the second catalyst 59 is disposed at a position offset to a higher location from the up-down middle position HC1 of the first exhaust pipe 55.

According to this configuration, a plurality of the first and second catalysts 58 and 59 can be dividedly disposed in the first and second exhaust pipes 55 and 57 located upstream and downstream of the bent pipe 56. This enhances the degree of freedom of the arrangement, size, and the like of the catalysts, so that catalyst arrangement in the outboard motor 10 and securing of a high exhaust purification performance become easier, and downsizing of the outboard motor 10 is also enabled. Moreover, even in the case where the entire catalyst is not effectively used in the first catalyst 58 (for example, in the case where the temperature of the first catalyst 58 becomes excessively high), exhaust gas having a low purification rate passes through the second catalyst 59 at a position spaced apart from the first catalyst 58, so that the total purification rate can be enhanced.

Furthermore, the temperature of the first catalyst 58 can be increased by high-temperature exhaust gas on the upstream side, and the temperature of the second catalyst 59 can be increased by the exhaust gas right after passing through the first catalyst 58, which is advantageous for early activation of the first and second catalysts 58 and 59. Furthermore, a distance from the first catalyst 58 to the exhaust pipe outlet and a height from the water surface of the second catalyst 59 can be secured effectively, which is advantageous for prevention of exposure of the first and second catalysts 58 and 59 to water. These reduce constraints on arrangement of the catalysts and achieve both early activation and long-term performance maintenance of the catalysts.

Furthermore, each of the first and second catalysts 58 and 59 is located offset to a higher location from the up-down middle position HC1 of the first exhaust pipe 55 and is disposed at a height in which at least a part of the first catalyst 58 and at least a part of the second catalyst 59 overlap with each other in the horizontal direction, so that it is possible to dispose the first and second catalysts 58 and 59 at a relatively high position while preventing the first and second exhaust pipes 55 and 57 from increasing their sizes upward, and it is effective for countermeasures for exposure of the first and second catalysts 58 and 59 to water.

Furthermore, the first exhaust pipe 55 is adjacent to the exhaust manifold 52 and extends upward along the exhaust manifold 52, so that the temperature of the first catalyst 58 can be increased by effectively using heat of the exhaust manifold 52 whose temperature becomes relatively high due to heat of the exhaust gas right after exhausted.

Furthermore, the second exhaust pipe 57 is adjacent to the first exhaust pipe 55. By these, the entire exhaust pipe 53 is easily made compact, which is effective for downsizing of the outboard motor 10.

Furthermore, the gaps S2 and S4 through which exhaust gas is capable of passing are provided between the first exhaust pipe 55 and the first catalyst 58 and between the second exhaust pipe 57 and the second catalyst 59, making it easier to reduce the exhaust resistance. In the case where the exhaust resistance can be adjusted within a proper range, either the gap S2 or S4 may not be provided.

Furthermore, in the exhaust pipe 53, at least the bent pipe 56 is provided with the water jacket 63, making it easier to prevent excessive increases in the temperatures of the exhaust pipes 55, 56, and 57, the first catalyst 58, and the second catalyst 59. In the case where the temperatures of the exhaust pipes 55, 56, and 57, the first catalyst 58, and the second catalyst 59 can be made within a proper range, the water jacket 63 may not be provided.

Furthermore, the second catalyst 59 is of a simple type in which the second catalyst 59 is different from the first catalyst 58 in at least either the catalyst material or the carrier that supports the catalyst material, which is advantageous for the cost reduction. In this case, a three-way catalyst is used for the first catalyst 58, and a catalyst that removes only nitrogen oxides is used for the second catalyst 59, so that in the case of the lean combustion in which the air-fuel ratio is set to the leaner side than the theoretical air-fuel ratio, NOx that was not sufficiently removed by the three-way catalyst is easily sufficiently removed by the second catalyst 59 while CO and HC are sufficiently removed by the three-way catalyst.

Furthermore, in the case where the second catalyst 59 is of an adsorptive type that adsorbs nitrogen oxides, the controller 71, when determining that the adsorption amount of the second catalyst 59 is in the state close to the saturated state based on the information detected by the second and third sensors 76 and 77, controls the air-fuel ratio to the richer side than the theoretical air-fuel ratio and promotes the reduction reaction of the nitrogen oxides absorbed by the second catalyst 59, so that a situation where the adsorption amount of the second catalyst 59 is in a saturated state can be avoided.

Second Embodiment

Figure 4:
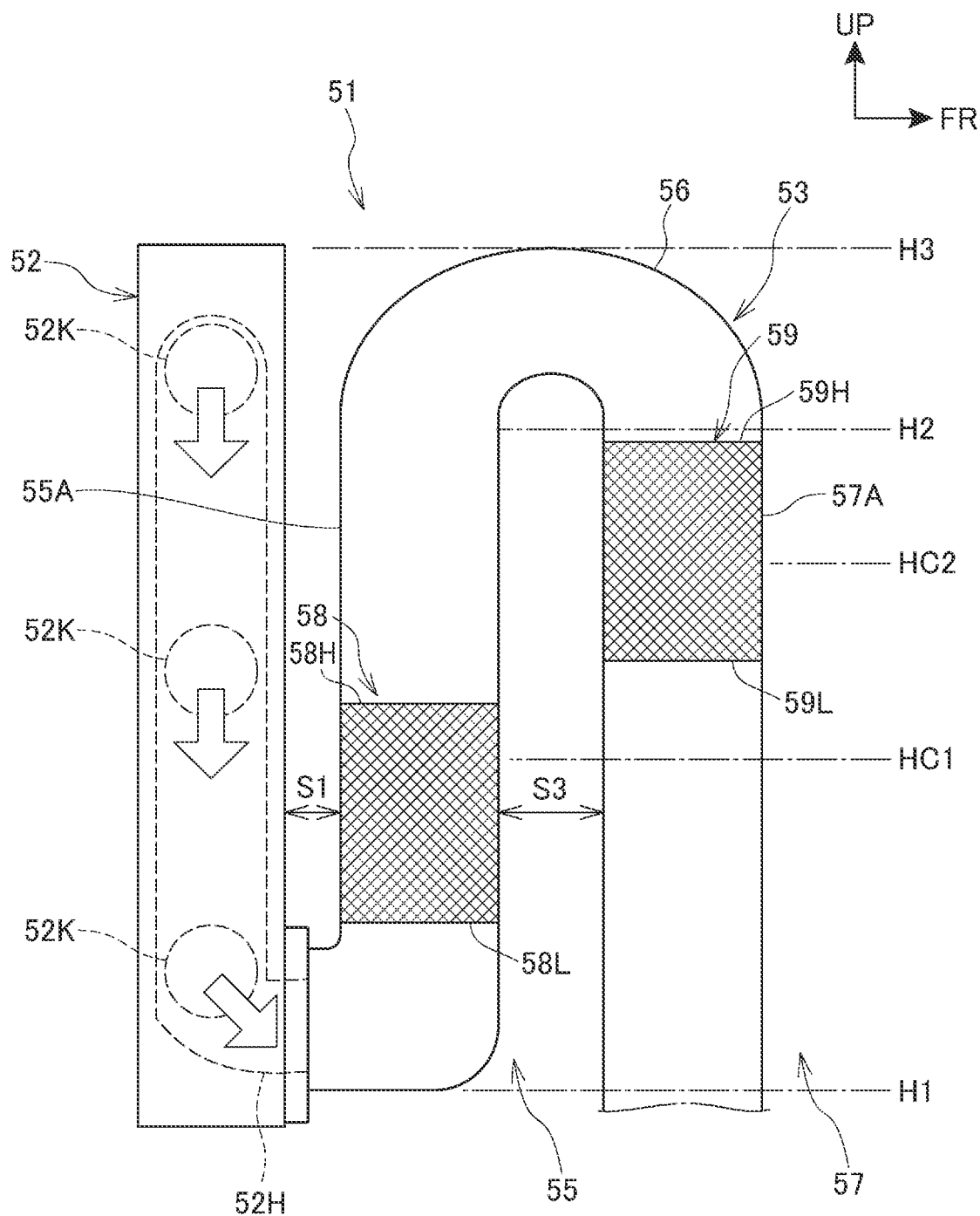
FIG. 4 is a view schematically illustrating a structure of exhaust system components of an outboard motor according to a second embodiment.

FIG. 4 is a view schematically illustrating a structure of the exhaust system components 51 of the outboard motor 10 of a second embodiment. Configurations similar to those of the first embodiment are denoted by the same reference signs, and repetitive descriptions thereof are omitted.

The second embodiment is different from the first embodiment in that the lower end 58L corresponding to the upstream end of the first catalyst 58 is disposed as near as possible to the lower end position H1 of the first exhaust pipe 55, and in that the upper end 59H corresponding to the upstream end of the second catalyst 59 is disposed as near as possible to the upper end position of the second exhaust pipe 57 (at the same height as the upper end position H2 of a first exhaust pipe 57M in the present embodiment). In other words, the lower end 58L of the first catalyst 58 is at a position lower than the second catalyst 59, and a height difference between the first catalyst 58 and the second catalyst 59 is maximized.

According to this configuration, the first catalyst 58 is as close as possible to the exhaust outlet of the exhaust manifold 52, so that the temperature of the first catalyst 58 can be increased by higher-temperature exhaust gas, and the exhaust purification efficiency of the first catalyst 58 can be prioritized. Furthermore, the second catalyst 59 can be disposed at a position as higher as possible than the water surface, so that the effect of preventing exposure of the second catalyst 59 to water can be enhanced.

Furthermore, a separation distance between the first catalyst 58 and the second catalyst 59 can be made longer, so that even in the case where the entire catalyst is not effectively used in the first catalyst 58 (for example, in the case where the temperature of the first catalyst 58 becomes excessively high), the total purification rate is easily secured by the second catalyst 59.

Figure 5:
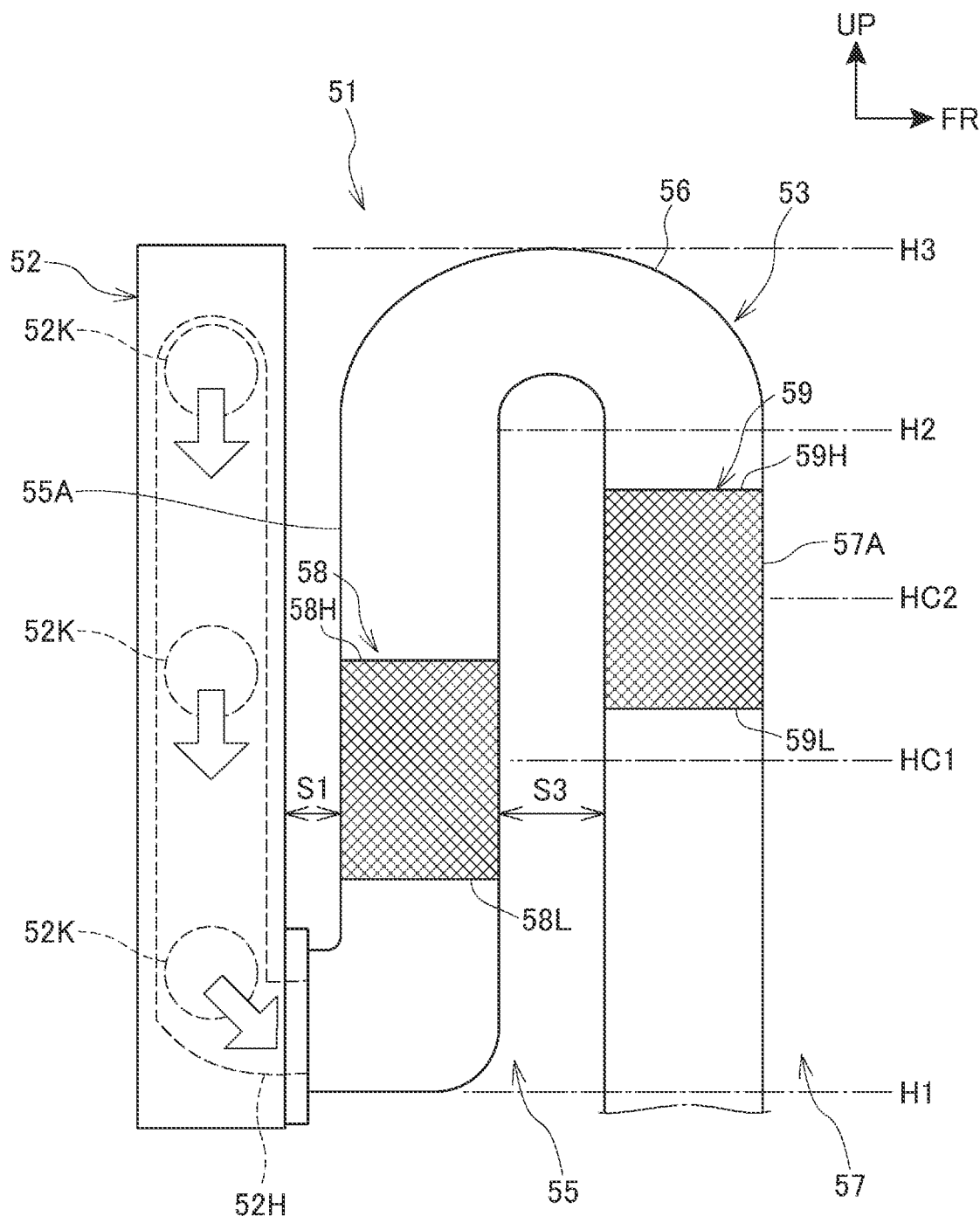
FIG. 5 is a view for describing a modification of the second embodiment.

Although the example of FIG. 4 illustrates the case where the lower end 59L of the second catalyst 59 is disposed above the upper end 58H of the first catalyst 58, it is not limited to this. For example, positions of the first and second catalysts 58 and 59 may be finely adjusted within a range of preventing the first and second exhaust pipes 55 and 57 from increasing their sizes upward, and as illustrated in FIG. 5, the lower end 59L of the second catalyst 59 may be disposed below the upper end 58H of the first catalyst 58 to cause the first and second catalysts 58 and 59 to at least partially overlap with each other in the horizontal direction.

Each of the above-described embodiments is merely an embodiment of the present invention, and any modifications and applications are possible without departing from the gist of the present invention.

For example, although in the above-described embodiments, the case where the engine 23 is a gasoline engine has been described, an engine that requires exhaust purification, such as a diesel engine, may be used. An appropriate catalyst may be selected for the first and second catalysts 58 and 59 according to the engine 23. For example, in the case of a diesel engine, a catalyst suitable for a diesel engine, such as a selection catalyst reduction (SCR) catalyst or a soot catalyst, may be used.

Furthermore, although the case where the present invention is applied to the outboard motor 10 illustrated in FIG. 1 and the like has been described, the present invention may be applied to known other outboard motors. In this case, the shapes and positions of the exhaust manifold 52, the exhaust pipe 53, and the like which form the exhaust system components 51 may be appropriately changed according to positions of the engine 23 and a space vacant around the engine 23, and the like.

REFERENCE SIGNS LIST

10 outboard motor
12 outboard motor body
16 attachment part
23 engine
24 engine cover
41 intake system components
51 exhaust system components
52 exhaust manifold
53 exhaust pipe
55 first exhaust pipe
56 bent pipe
57 second exhaust pipe
58 first catalyst
59 second catalyst
63 water jacket
71 controller
75, 76, 77 first to third sensors
HC1 up-down middle position of first exhaust pipe
S1 to S4 gap

The invention claimed is:

1. An outboard motor comprising an engine at a position higher than a water surface, the outboard motor comprising:
   an exhaust manifold provided in the engine to collect exhaust gas from the engine; and
   an exhaust pipe extending from the exhaust manifold,
   wherein the exhaust pipe comprises:
   a first exhaust pipe extending upward on a side of the exhaust manifold;
   a bent pipe extending from the first exhaust pipe and bending downward; and
   a second exhaust pipe extending downward from the bent pipe and adjacent to the first exhaust pipe,
   a first catalyst for exhaust purification is provided in the first exhaust pipe, and a second catalyst for exhaust purification is provided in the second exhaust pipe, and
   the second catalyst is disposed at a position offset to a higher location from an up-down middle position of the first exhaust pipe.

2. The outboard motor according to claim 1, wherein each of the first and second catalysts is located offset to a higher location from the up-down middle position of the first exhaust pipe and is disposed at a height in which at least a part of the first catalyst and at least a part of the second catalyst overlap with each other in a horizontal direction.

3. The outboard motor according to claim 1, wherein a lower end of the first catalyst is provided at a position lower than the second catalyst.

4. The outboard motor according to claim 3, wherein each of the first and second catalysts is located at a height in which at least a part of the first catalyst and at least a part of the second catalyst overlap with each other in a horizontal direction.

5. The outboard motor according to claim 1, wherein the first exhaust pipe is adjacent to the exhaust manifold and extends upward along the exhaust manifold.

6. The outboard motor according to claim 1, wherein the second exhaust pipe is adjacent to the first exhaust pipe.

7. The outboard motor according to claim 6, wherein the second exhaust pipe is provided on an opposite side of the exhaust manifold via the first exhaust pipe.

8. The outboard motor according to claim 1, wherein a gap through which exhaust gas is capable of passing is provided at least either between the first exhaust pipe and the first catalyst or between the second exhaust pipe and the second catalyst.

9. The outboard motor according to claim 1, wherein in the exhaust pipe, at least the bent pipe is provided with a water jacket.

10. The outboard motor according to claim 1, wherein the second catalyst is of a simple type in which the second catalyst is different from the first catalyst in at least either a catalyst material or a carrier that supports the catalyst material.

11. The outboard motor according to claim 1, wherein the first catalyst is a three-way catalyst, and the second catalyst is a catalyst that removes only nitrogen oxides.

12. The outboard motor according to claim 1,
   wherein the second catalyst is of an adsorptive type that adsorbs nitrogen oxides,
   the outboard motor comprises:
   a controller capable of controlling an air-fuel ratio of an air-fuel mixture supplied to the engine; and
   a sensor that detects information capable of identifying whether an adsorption amount of the second catalyst is in a state close to a saturated state, and the controller, in a case of controlling the air-fuel ratio to a leaner side than a theoretical air-fuel ratio, when determining that the adsorption amount of the second catalyst is in the state close to the saturated state based on the information detected by the sensor, controls the air-fuel ratio to a richer side than the theoretical air-fuel ratio and promotes a reduction reaction of the nitrogen oxides absorbed by the second catalyst.

\* \* \* \* \*